(12) United States Patent
Holzapfel

(10) Patent No.: US 7,907,286 B2
(45) Date of Patent: Mar. 15, 2011

(54) OPTICAL POSITION-MEASURING DEVICE

(75) Inventor: Wolfgang Holzapfel, Obing (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 529 days.

(21) Appl. No.: 12/110,940

(22) Filed: Apr. 28, 2008

(65) Prior Publication Data
US 2008/0285058 A1 Nov. 20, 2008

Related U.S. Application Data

(60) Provisional application No. 60/938,271, filed on May 16, 2007.

(30) Foreign Application Priority Data

May 16, 2007 (DE) .................... 10 2007 023 300

(51) Int. Cl.
    *G01B 11/02* (2006.01)
    *G01D 5/34* (2006.01)

(52) U.S. Cl. .................................... 356/499; 250/231.16

(58) Field of Classification Search .................. 356/488, 356/494, 499, 521; 250/231.16
See application file for complete search history.

(56) References Cited

U.S. PATENT DOCUMENTS

| | | | |
|---|---|---|---|
| 3,884,580 A | 5/1975 | Webster et al. | |
| 4,074,131 A | 2/1978 | Schwebel | |
| 5,333,048 A * | 7/1994 | Michel et al. | 356/494 |
| 5,569,913 A * | 10/1996 | Ishizuka et al. | 250/237 G |
| 5,621,527 A * | 4/1997 | Kaneda et al. | 356/499 |
| 5,648,658 A * | 7/1997 | Holzapfel et al. | 250/237 G |
| 5,689,336 A * | 11/1997 | Huber | 356/499 |
| 5,977,539 A | 11/1999 | Holzapfel et al. | |
| 6,445,456 B2 * | 9/2002 | Speckbacher et al. | 356/499 |
| 6,497,049 B1 * | 12/2002 | Holzapfel et al. | 33/707 |
| 6,838,688 B2 | 1/2005 | Aoki | |
| 6,885,457 B1 | 4/2005 | Michel et al. | |
| 6,940,603 B2 * | 9/2005 | Ito | 356/499 |
| 7,019,842 B2 * | 3/2006 | Holzapfel et al. | 356/499 |
| 7,154,609 B2 * | 12/2006 | Holzapfel et al. | 356/499 |
| 7,348,546 B2 * | 3/2008 | Schoser et al. | 250/231.13 |
| 7,471,397 B2 * | 12/2008 | Holzapfel | 356/494 |

(Continued)

FOREIGN PATENT DOCUMENTS

DE     25 21 618      3/1976

(Continued)

OTHER PUBLICATIONS

PCT International Search Report, PCT International Application No. PCT/EP2008/003553, dated Sep. 1, 2008 (translated).

(Continued)

*Primary Examiner* — Patrick J Connolly
(74) *Attorney, Agent, or Firm* — Kenyon & Kenyon LLP

(57) ABSTRACT

An optical position-measuring device is arranged for recording the relative position of a scanning unit and a scale movable to it in at least one measuring direction. The scale is configured as a combined unit which includes at least one reflector element as well as a measuring graduation. A light source and one or more detector elements are assigned to the scanning unit. The scanning unit includes splitting device(s) which split the beam of rays, emitted by the light source, into at least two partial beams of rays in the measuring direction, which after being split, propagate in the direction of the scale.

18 Claims, 8 Drawing Sheets

U.S. PATENT DOCUMENTS

| | | | |
|---|---|---|---|
| 7,573,581 B2 * | 8/2009 | Holzapfel | 356/499 |
| 7,636,165 B2 | 12/2009 | Klaver et al. | |
| 7,710,578 B2 * | 5/2010 | Sandig et al. | 356/499 |
| 7,796,272 B2 * | 9/2010 | Holzapfel | 356/510 |
| 2001/0017349 A1 * | 8/2001 | Holzapfel et al. | 250/231.13 |
| 2003/0076507 A1 * | 4/2003 | Ito | 356/499 |
| 2004/0119989 A1 * | 6/2004 | Mayer et al. | 356/616 |
| 2006/0180748 A1 * | 8/2006 | Schoser et al. | 250/221 |
| 2007/0013920 A1 | 1/2007 | Holzapfel | |
| 2008/0062432 A1 * | 3/2008 | Sandig et al. | 356/499 |
| 2008/0282566 A1 * | 11/2008 | Holzapfel | 33/707 |
| 2009/0257066 A1 * | 10/2009 | Tamiya et al. | 356/482 |

FOREIGN PATENT DOCUMENTS

| | | |
|---|---|---|
| DE | 86 28 805 | 3/1989 |
| DE | 101 33 266 | 3/2002 |
| DE | 10 2005 029 917 | 1/2007 |
| DE | 10 2006 042 743 | 3/2008 |
| EP | 0 163 362 | 2/1985 |
| EP | 0 387 520 | 9/1990 |
| EP | 0 482 553 | 4/1992 |
| EP | 1 347 271 | 9/2003 |
| EP | 1 734 394 | 12/2006 |
| EP | 1 739 395 | 1/2007 |
| EP | 1 837 630 | 3/2007 |
| WO | WO 02/23131 | 3/2002 |
| WO | WO 2007/034379 | 3/2007 |

OTHER PUBLICATIONS

PCT International Search Report, PCT International Application No. PCT/EP2008/003552, dated Aug. 14, 2008 (translated).

* cited by examiner

OPTICAL POSITION-MEASURING DEVICE

CROSS-REFERENCE TO RELATED APPLICATIONS

The present application claims the benefit of U.S. Provisional Patent Application No. 60/938,271, filed on May 16, 2007, and claims priority to Application No. 10 2007 023 300.2, filed in the Federal Republic of Germany on May 16, 2007, each of which is expressly incorporated herein in its entirety by reference thereto.

FIELD OF THE INVENTION

The present invention relates to an optical position-measuring device.

BACKGROUND INFORMATION

Conventional optical position-measuring devices for recording the relative position of two movable objects usually include a scanning unit, as well as a scale movable to it in at least one measuring direction. The scanning unit and scale are in each case connected to the two objects, e.g., to machine parts movable relative to each other. In general, the correct mounting of the scanning unit and scale relative to each other proves to be problematic. An unwanted twisting of scale and scanning unit about an axis perpendicular to the scale is usually referred to as a "moiré twisting". The results of such moiré twistings in measuring operation are a decline of the scanning-signal intensity and unwelcome errors in the position measurement.

For example, it is possible to reduce moiré errors using an optical position-measuring device as described in PCT International Published Patent Application No. WO 02/23131. In addition to a scale, e.g., taking the form of a linear reflected-light scale, it includes a scanning unit displaceable relative thereto in at least one measuring direction. In addition to a scanning grating several optoelectronic detector elements, inter alia, at least one optical reflector element in the form of a retro-reflector is disposed on the side of the scanning unit. The partial beams of rays, reflected for the first time by the scale, are reflected via the retro-reflector back in the direction of the scale. There, the partial beams of rays are subsequently reflected a second time before interfering partial beams of rays ultimately arrive at the detector elements and there, generate scanning signals modulated as a function of displacement. In the position-measuring device, the reflector element takes the form of a roof prism having optical retro-reflector functionality. Further position-measuring devices having optical reflector elements in the form of prism-like retro-reflector elements are described, for instance, in European Published Patent Application No. 0 387 520 and European Published Patent Application No. 1 347 271.

SUMMARY

Example embodiments of the present invention provide an optical position-measuring device which ensures compensation—improved as compared to conventional systems—of possible errors of the kind which result especially in response to moiré twistings of the scanning unit and scale.

According to example embodiments of the present invention, it is provided to form the scale as a combined unit which, in addition to a measuring graduation, also includes one or more reflector elements. Already before the scale, the beam of rays coming from a light source is split into at least two partial beams of rays which, in the scale, in each case impinge on the measuring graduation twice and the reflector element once before they in turn propagate in the direction of the scanning unit, where the displacement-dependent signals are detected.

Based on such a formation of the scale, i.e., the scanning ray trajectory possible with it, a possibly resulting moiré twisting may be reliably corrected in optical manner. In the optical position-measuring device, moiré twistings no longer have an erroneous effect on the position measurement and no longer lead to a decline in the intensity of the scanning signal. This is especially advantageous, particularly given the use of small graduation periods on the part of the measuring graduation, that is, when working with high-resolution position-measuring devices.

Because of the lateral offset of the partial beams of rays falling on and exiting the scale, it is possible to dispense with an otherwise necessary oblique illumination of the measuring graduation to separate these partial beams of rays. This results in scanning optics having increased overall symmetry, which leads to substantially greater alignment tolerances.

The optical position-measuring device makes it possible to record or determine the relative position of a scanning unit as well as a scale movable to it in at least one measuring direction. The scale is configured as a combined unit which includes at least one reflector element and a measuring graduation. A light source and one or more detector elements are assigned to the scanning unit. The scanning unit includes a splitting device which splits the beam of rays, emitted by the light source, into at least two partial beams of rays in the measuring direction, which after being split, propagate in the direction of the scale.

The measuring graduation may be formed such that the at least two partial beams of rays incoming from inversely symmetrical directions undergo an opposite deflection effect, and after the impingement of the measuring graduation, propagate in the same spatial directions.

The measuring graduation may be formed such that the at least two partial beams of rays incoming from different directions undergo an opposite deflection effect, and after the impingement of the measuring graduation, propagate in symmetrical spatial directions.

For instance, the measuring graduation may be formed such that:
a first deflection effect on the incoming partial beams of rays results in a plane which is defined by the measuring direction and a normal to the scale, and
a second deflection effect on the incoming partial beams of rays results in a direction which is oriented transversely to the measuring direction, a focusing on the at least one reflector element being associated with the second deflection.

The measuring graduation may be in the form of an alternating linear cylindrical-lens structure.

It is further possible to select the periodicity of the measuring graduation such that only partial beams of rays of a $+1^{st}$ and $-1^{st}$ order of diffraction occur in both deflecting directions, and unwanted higher orders of diffraction, especially the $+3^{rd}$ and $-3^{rd}$ orders of diffraction, are suppressed.

In the scale, the split partial beams of rays may be initially diffracted at the measuring graduation, are thereupon reflected at the at least one reflector element, and are diffracted once more at the measuring graduation before they propagate again in the direction of the scanning unit.

The measuring graduation may be formed both as a transmitted-light graduation or as a reflected-light graduation.

It is further possible for the scale to include a transparent support member, and for the measuring graduation to be disposed on one side of the support member, while the at least one reflector element is situated on the opposite side of the support member.

In this context, a measuring graduation in the form of a transmitted-light graduation may be disposed on the side of the support member facing the scanning unit.

The reflector element may be formed either as at least one plane reflector mirror or as a totally reflecting surface.

The splitting device in the scanning unit may include at least one transmitted-light scanning grating.

In addition, it is possible to arrange a plurality of graduation tracks on the scale.

In this case, the second deflection effect of all graduation tracks may have one common focus.

The measuring graduation of the scale may take the form of a phase graduation having a phase height of 180°.

The second deflection effect may be dimensioned so that the beam offset at the scale between the incoming and exiting beam of rays is greater than the beam cross-section.

Further features and aspects of example embodiments of the present invention are explained in more detail below in the following description with reference to the appended Figures.

BRIEF DESCRIPTION OF THE DRAWINGS

FIG. 1b shows a transverse view of the scanning optics of the position-measuring device illustrated in FIG. 1a.

FIG. 2b shows a detailed transverse view to illustrate the deflection effect of the scale having retro-reflector effect in the position-measuring device illustrated in FIGS. 1a, 1b, and 2a.

FIG. 4b shows a transverse view of the scanning optics of the position-measuring device illustrated in FIG. 4a.

FIG. 6b shows a transverse view of the scanning optics of the position-measuring device illustrated in FIG. 6a.

FIG. 7b shows a transverse view of the scanning optics of the position-measuring device illustrated in FIG. 7a.

DETAILED DESCRIPTION

Figure 1A:
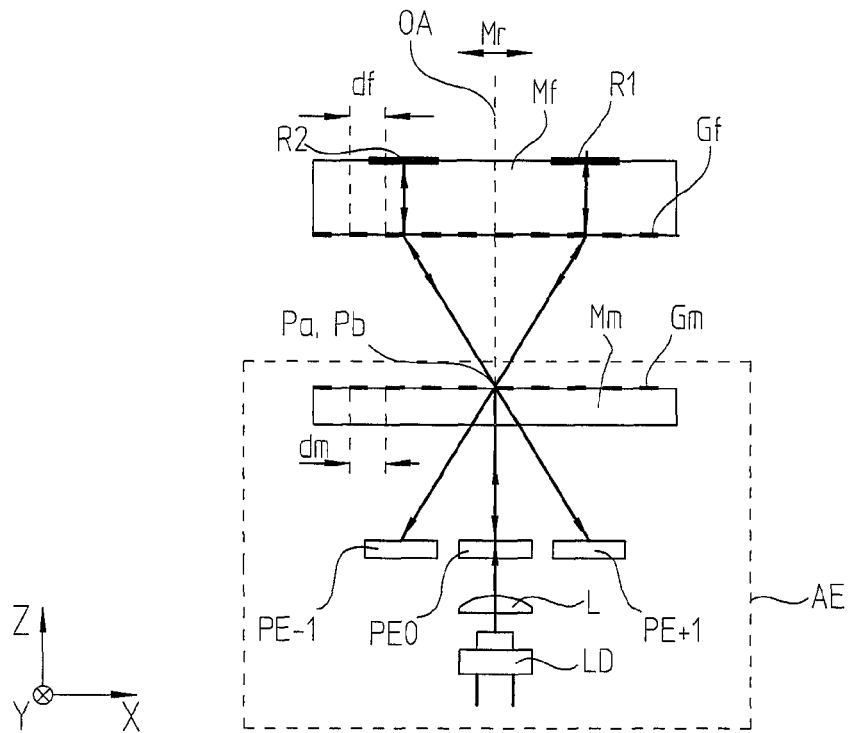
FIG. 1a shows a front view of scanning optics of a position-measuring device according to an example embodiment of the present invention.
Figure 1B:
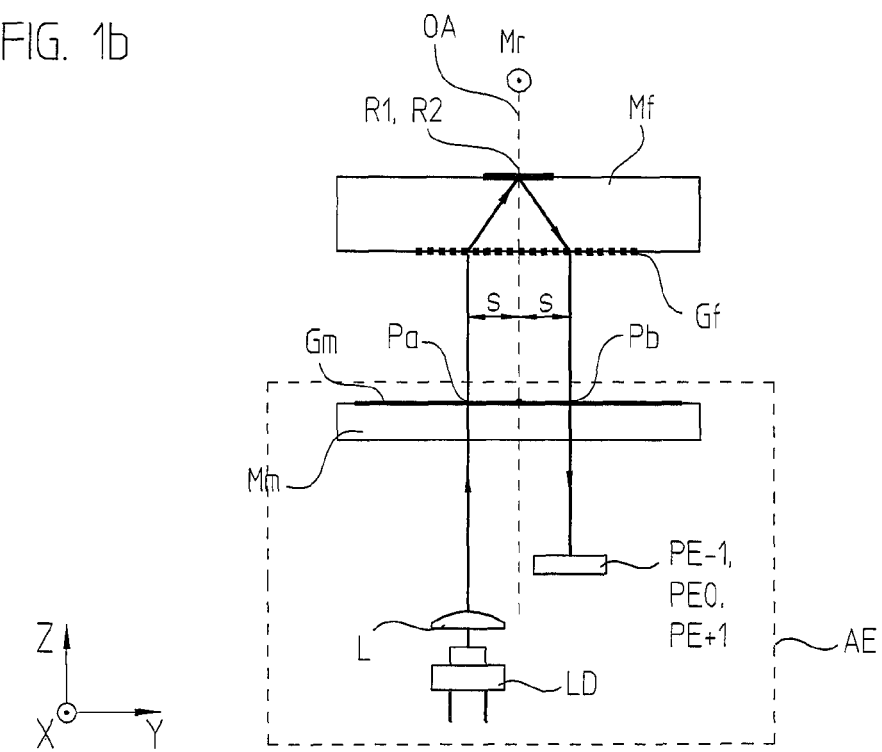
Figure 2A:
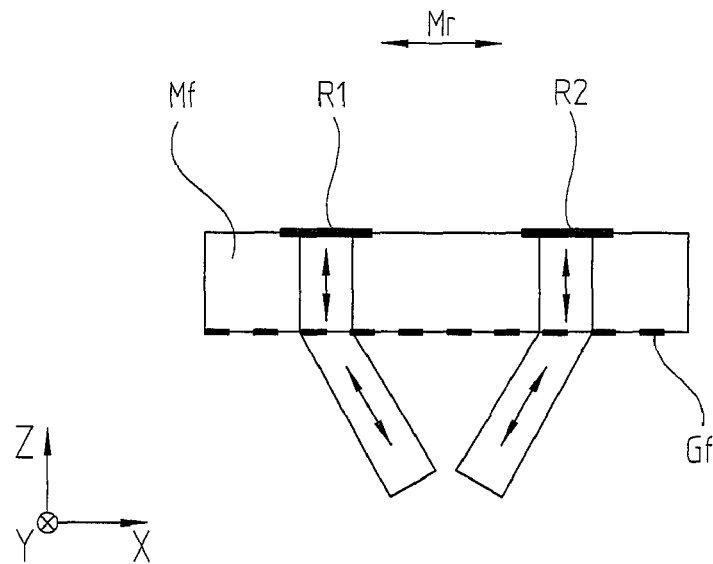
FIG. 2a shows a detailed front view to illustrate the deflection effect of the scale having retro-reflector effect in the position-measuring device illustrated in FIGS. 1a and 1b.
Figure 2B:
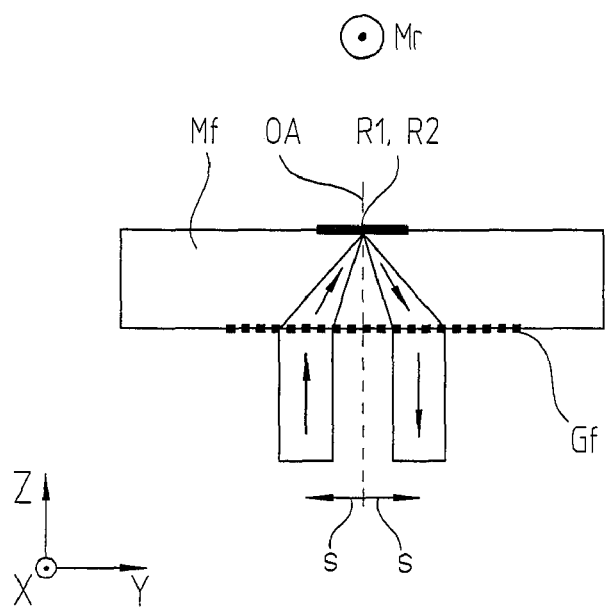

In the following, a position-measuring device according to an example embodiment of the present invention is explained with reference to FIGS. 1a, 1b, 2a, 2b and 3. FIGS. 1a and 1b show scanning optics of the position-measuring device in different views, the position-measuring device including a scanning unit AE, as well as a scale Mf movable relative to it in measuring direction Mr. Scanning unit AE and scale Mf are joined to the objects whose relative position is to be recorded. For example, they may be two machine parts movable relative to each other.

Scale Mf of the position-measuring device is in the form of a combined unit which includes two reflector elements R1, R2, as well as a measuring graduation Gf. A light source LD as well as a plurality of detector elements PE−1, PE0, PE+1 are assigned to scanning unit AE. Scanning unit AE also includes splitting device Mm having a transmitted-light scanning grating Gm. As an alternative to the arrangement shown of light source LD and detector elements PE−1, PE0, PE+1 in a housing of scanning unit AE, it could also be provided to position these elements spatially separate from scanning unit AE and to connect them to scanning unit AE via suitable light conductors and in this manner to assign them to scanning unit AE.

The beam of rays emitted by light source LD, taking the form of a laser diode, for example, is collimated by a collimator lens L, and is directed parallel to optical axis OA, perpendicularly to splitting device Mm. At its upper side, transmitted-light scanning grating Gm splits the beam of rays at splitting location Pa into at least two partial beams of rays, e.g., into the $-1^{st}$ and $+1^{st}$ order of diffraction. Both partial beams of rays propagate in the direction of scale Mf, which on the lower side of a transparent support element that is facing scanning unit AE, bears a measuring graduation Gf formed as a special transmitted-light graduation. Measuring graduation Gf directs the partial beams of rays, as viewed in measuring direction Mr, parallel to optical axis OA. Transversely thereto, measuring graduation Gf focuses the partial beams of rays and deflects them, so that in the focused state, they strike reflector elements R1 and R2, respectively, on the back side of the support element of scale Mf, which is oriented facing away from scanning unit AE. After being reflected at reflector elements R1, R2, the partial beams of rays arrive again at measuring graduation Gf. There, they are deflected again in measuring direction Mr, the deflection taking place symmetrically with respect to the arriving partial beams of rays. Transversely to measuring direction Mr, measuring graduation Gf collimates the partial beams of rays again and directs them parallel to optical axis OA. The exiting partial beams of rays arrive back at transmitted-light scanning grating Gm in scanning unit AE, where at combining location Pb, they are superposed by diffraction into resulting $+1^{st}$, $0^{th}$ and $-1^{st}$ order of diffraction and brought to interference.

The graduation structure of transmitted-light scanning grating Gm of splitting device Mm is selected so that the partial beams of rays exiting in $-1^{st}$, $0^{th}$ and $+1^{st}$ resulting order of diffraction, in each case phase-shifted by 120°, are modulated in their intensity and are detected by detector elements PE−1, PE0 and PE+1.

Also decisive is the form of measuring graduation Gf. To illustrate the optical effect of measuring graduation Gf, the optical path in the scanning ray trajectory in the area of scale Mf is shown in detail in FIGS. 2a and 2b. Measuring graduation Gf, in the form of a diffractive structure, implements two functions simultaneously.

First of all, it deflects the incident partial beams of rays into or counter to measuring direction Mr. This deflection effect corresponds to the optical effect of a periodic graduation having a graduation period or periodicity df. Since measuring graduation Gf, formed in this example as a transmitted-light graduation, is traversed twice, for this exemplary embodiment, periodicity df must be equal to the graduation period or periodicity dm of transmitted-light scanning grating Gm of splitting device Mm.

Secondly, measuring graduation Gf represents a diffractive cylindrical lens. This cylindrical lens focuses the partial beams of rays transversely to measuring direction Mr onto reflector elements R1 and R2, respectively, as is evident from FIG. 2b. The simultaneous deflection transversely to measuring direction Mr comes about due to offset S of the incident partial beams of rays with respect to center Z of the cylindrical lens. Reflector elements R1 and R2 may be formed both as metallic mirrors and as interference mirrors.

The cylindrical lens, which is traversed twice in the optical path, together with reflector elements R1 and R2, respectively, represents an optical retro-reflector that reverses the direction of the incoming beam transversely and only transversely with respect to measuring direction Mr. This retro-reflector has the same optical effect as a roof prism having a 90° prism angle. The retro-reflection makes it possible to compensate for substantially greater twistings of scale Mf or of scanning unit AE together with splitting device Mm about optical axis OA. In response to such a tilt, referred to as moiré twisting, of scale Mf or of scanning unit AE having splitting device Mm, opposite beam tilts of the two partial beams of rays occur transversely to measuring direction Mr. Without retro-reflector, the moiré tilt causes a signal breakdown which, particularly in the case of position-measuring devices having a small signal period, is very great. Extremely small permissible adjustment tolerances with regard to the moiré tilt are the result. Due to the optical effect of the retro-reflector, compensation is made for the beam tilts transversely to measuring direction Mr, so that substantially greater moiré tolerances are allowed, even when working with position-measuring devices having a very small signal period. Further explanations regarding this can be found in German Published Patent Application No. 10 2005 029 917 and in German Published Patent Application No. 10 2006 042 743.

Figure 3:
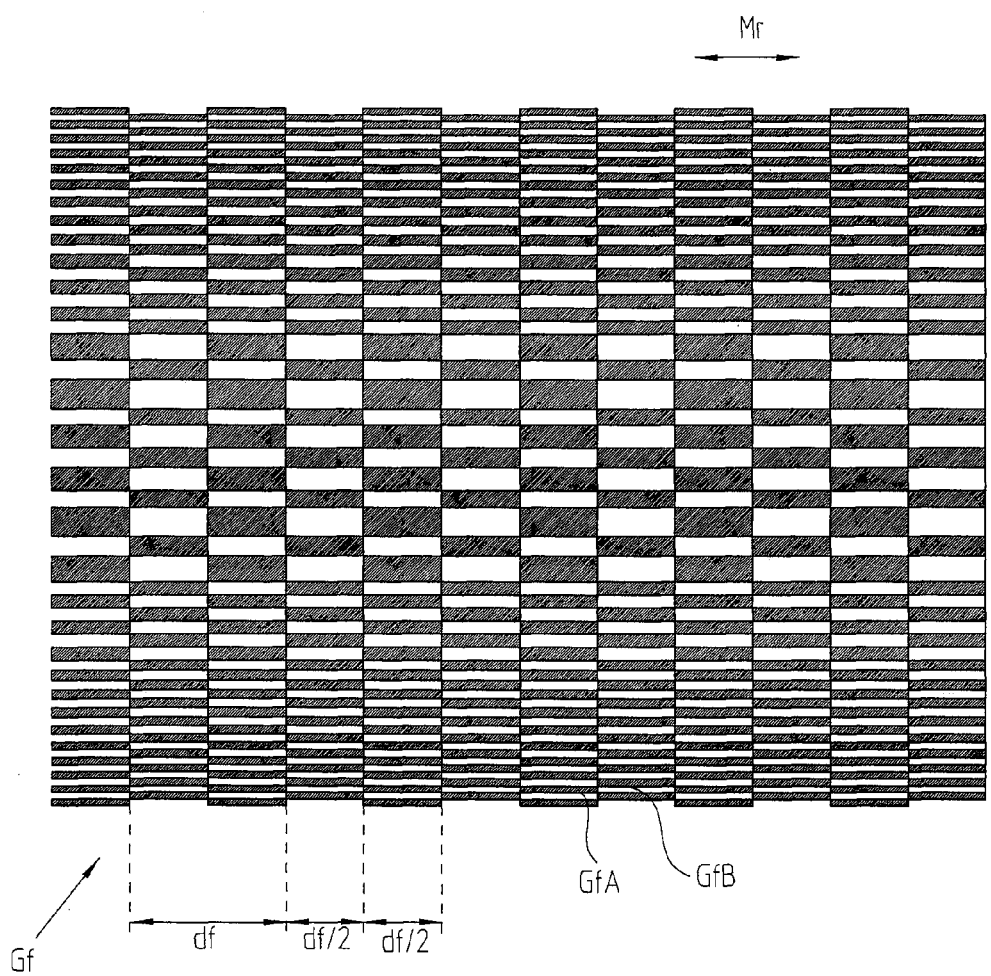
FIG. 3 shows a detail view of the structure of a graduation, formed as a retro-reflector graduation, in the position-measuring device illustrated in FIGS. 1a, 1b, 2a, and 2b.
Figure 3:
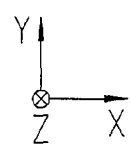

In contrast to the (scanning) graduations described in German Published Patent Application No. 10 2005 029 917, measuring graduation Gf described herein must deflect the incoming partial beams of rays both in and counter to measuring direction Mr, and therefore must possess the splitting effect of a normal graduation. The result is that necessary measuring graduation Gf must be dimensioned differently. FIG. 3 shows details of the structure of measuring graduation Gf ("retro-reflector graduation"). It includes individual strips GfA, GfB, each having a width of df/2, which are disposed periodically in measuring direction Mr. The two strips GfA, GfB are complementary to each other, that is, the structures may be mutually transferred, in that the two states of the binary structure are interchanged at each position. Each strip GfA, GfB represents a diffractive cylindrical lens. It is calculated based on the following phase function $\phi(y)$:

$$\phi(y) = \left[\frac{2\pi}{\lambda} \cdot n \cdot \sqrt{Df^2 + y^2}\right] \bmod 2\pi$$

where:
y:=transverse position
Df:=thickness of scale Mf
n:=refractive index of scale Mf
λ:=wavelength of light source used.

In strip GfA, the first state is present at each position where $|\phi(y)| \leq \pi/2$. In strip GfB, the complementary second state exists there. The binary structure may be formed as a phase graduation having a phase height of 180°. Since in the marginal area, the local graduation periods already lie in the range of wavelength λ, with the aid of numerical optimizations, phase heights and structure widths or forms are able to be adapted locally such that a maximum diffraction efficiency of the orders of diffraction used is achieved. As a rule, this optimization yields rounded structure elements instead of the rectangles shown in FIG. 3. It is possible—albeit costly—to form the strip-type cylindrical lenses as blazed structures.

As shown in FIG. 1b, measuring graduation Gf produces a beam offset 2*s transversely to measuring direction Mr. This allows an illumination direction of the collimated light source perpendicular to scale Mm and to splitting device Mf, and at the same time a detection by detector elements PE−1, PE0 and PE+1, disposed adjacent in the y-direction. To that end, the beam offset 2*s must be greater than the beam cross-section. An oblique illumination direction is not necessary here. Due to this high system symmetry, particularly great positional tolerances are achieved with regard to scale Mf, splitting device Mm and scanning unit AE. In particular for the distance between scale Mf and splitting device Mf, there is no longer any tolerance restriction relevant.

In general, the measuring graduations according to the first exemplary embodiment (retro-reflector graduation) may be combined with a great number of scanning principles. Thus, it is easily possible to equip scanning optics with a moiré compensation, and possibly also to offer it as a selection alternative for the respective customer.

In the embodiment described above, measuring graduation Mf as well as transmitted-light scanning grating Mm each have traversing graduation fields. Additional restrictions of the positional tolerances of scale Mf and of scanning unit AE relative to each other, which are necessary in the case of several variants described in PCT International Patent Application No. WO 2007/034379 in order to conduct the individual beams of rays through the associated graduation fields delimited from each other, are not required in the example embodiments described herein.

Figure 4A:
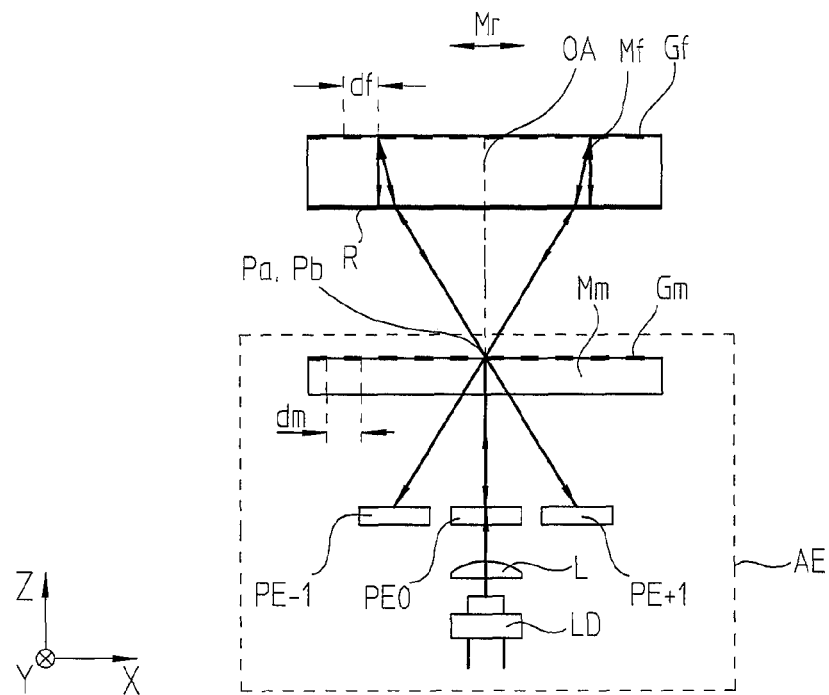
FIG. 4a shows a front view of scanning optics of a position-measuring device according to an example embodiment of the present invention.
Figure 4B:
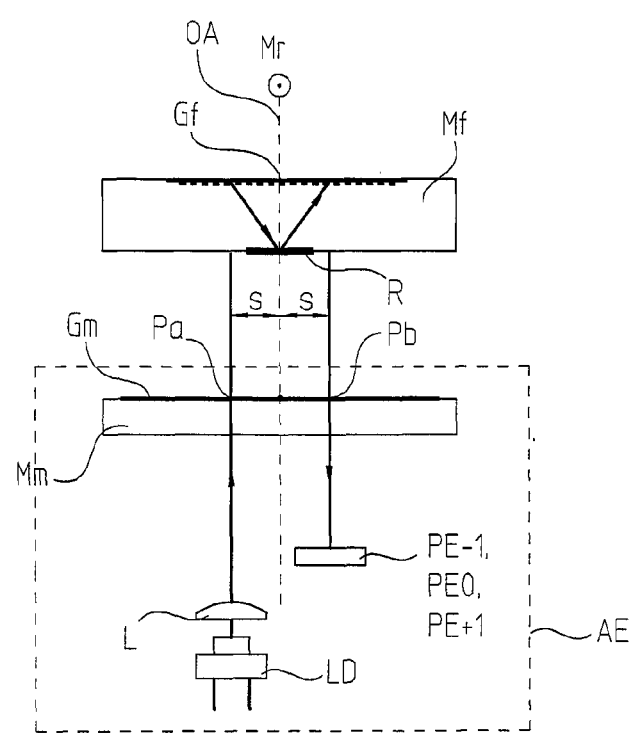
Figure 5A:
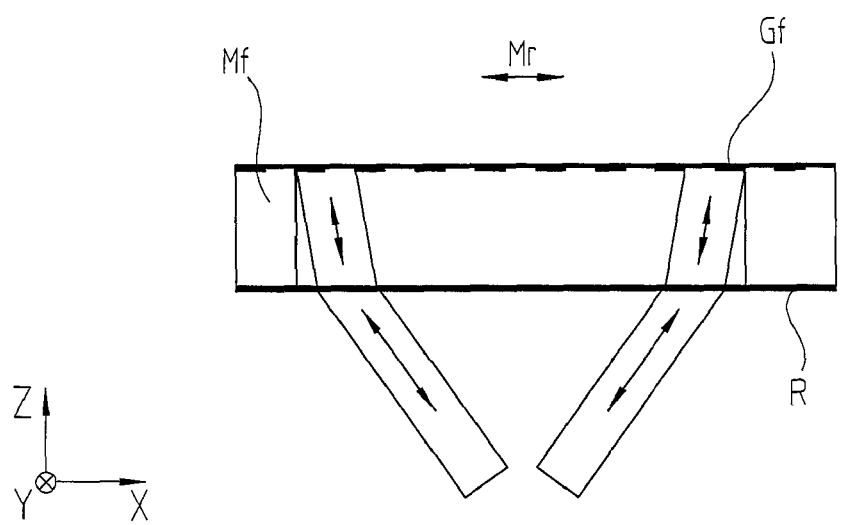
FIG. 5a shows a further front view for illustrating the deflection effect of the scale illustrated in FIGS. 4a and 4b.
Figure 5B:
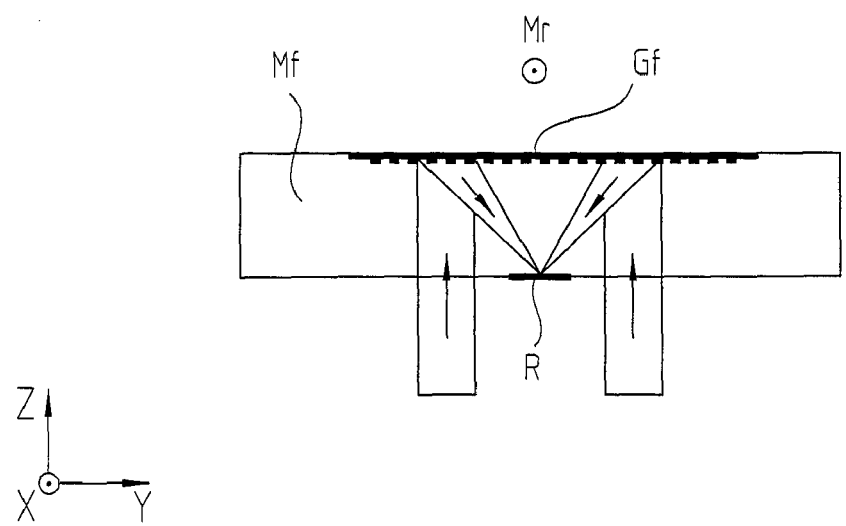
FIG. 5b shows another front view for illustrating the deflection effect of the scale illustrated in FIGS. 4a and 4b.

FIGS. 4a and 4b show the scanning optics of a second exemplary embodiment of a position-measuring device, analogous to the illustrations of the first exemplary embodiment in FIGS. 1a and 1b. Analogous to the first exemplary embodiment, FIGS. 5a and 5b show the optical path in the scanning ray trajectory in the area of scale Mf.

On the side of scanning unit AE, the beam of rays emitted by light source LD is again collimated by a collimator lens L, and is directed parallel to optical axis OA, perpendicularly to splitting device Mm. At its upper side, transmitted-light scanning grating Gm at splitting location Pa again splits the incoming beam of rays into partial beams of rays in a $-1^{st}$ and a $+1^{st}$ order of diffraction.

The two split partial beams of rays arrive at scale Mf which is movable relative to scanning unit AE, and which on its lower side, i.e., the side facing scanning unit AE, bears a reflector element R in the form of a reflective film in a central area. The reflective film has a reflective effect in the direction of the side facing away from scanning unit AE. Laterally adjacent to the reflective film, the split partial beams of rays are refracted at the lower side of scale Mf toward optical axis OA, deflected and arrive at measuring graduation Gf, taking the form of a reflective graduation or reflected-light graduation, at the upper side of scale Mf. In this example, measuring graduation Gf is in the form of a reflective phase grating, and in terms of its diffraction effect, possesses the same optical properties as graduation Gf, formed as a transmitted-light graduation, in the first exemplary embodiment illustrated in FIGS. 1a and 1b. This means that the partial beams of rays falling on measuring graduation Gf, as viewed in measuring direction Mr, are directed in parallel toward optical axis OA, and transversely to measuring direction Mr, the partial beams of rays are focused onto the reflective film or reflector element R. Thus, the optical effect of the measuring graduation corresponds again, in superposition, to a splitting grating in measuring direction Mr, and transversely to measuring direction Mr, to a diffractive cylindrical lens. The focal length of the diffractive cylindrical lens is selected such that the focus in the plane of reflector element R comes to lie on the same.

The partial beams of rays are subsequently reflected at the reflective film back in the direction of measuring graduation Gf, where the partial beams of rays are collimated once more, and at the same time deflected in measuring direction Mr. Because of offset s between the incoming partial beam of rays and optical axis OA of the cylindrical lens, a beam offset 2s between the partial beams of rays falling on scale Mf and the partial beams of rays exiting therefrom results transversely to measuring direction Mr, that is, in the y-direction. Upon leaving scale Mf, the partial beams of rays are refracted again, and all strike transmitted-light scanning grating Gm of splitting device Mm at combining location Pb where, analogous to the first exemplary embodiment, they are superposed by diffraction in the $+1^{st}$ and $-1^{st}$ order of diffraction, respectively, and brought to interference. As in the first exemplary embodiment, the graduation structure of transmitted-light scanning grating Gm is selected so that the beams of rays exiting therefrom in $-1^{st}$, $0^{th}$ and $+1^{st}$ resulting order of diffraction, in the event of the relative movement of the components displaceable relative to each other, in each case phase-shifted by 120°, are modulated in their intensity and are detected by detector elements PE−1, PE0 and PE+1.

A feature of this exemplary embodiment is in the form of scale Mf, which is configured as a "back-surface scale" having a measuring graduation Gf taking the form of a reflective phase grating. With regard to its specific optical properties, reference is made to the explanations for the first exemplary embodiment, which can be transferred to the reflective phase graduation.

A particular advantage in this example is that as measuring graduation Gf, scale Mf has a back-surface reflective graduation that is safe from becoming soiled. Dirt cannot penetrate into the grooves of the phase graduation, since measuring graduation Gf is protected by a planar reflective film, e.g., a metallic film. The opposite side of scale Mf has only flat surfaces which can be easily cleaned if soiled.

As a supplement to the second exemplary embodiment shown, an anti-reflection coating may also be applied to the lower side of scale Mf, in order to avoid interference reflections in response to the partial beams of rays entering and exiting the support member of scale Mf.

A third exemplary embodiment is described below with reference to FIGS. 6a and 6b, which again show various views of a position-measuring device analogous to the previous examples.

As in the previous examples, on the side of scanning unit AE, the beam of rays emitted by light source LD is collimated by a collimator lens L, and is directed parallel to optical axis OA, perpendicularly to splitting device Mm. At its upper side, transmitted-light scanning grating Gm at splitting location Pa splits the incoming beam of rays into three partial beams of rays in a $-1^{st}$, $0^{th}$ and $+1^{st}$ order of diffraction.

Figure 6A:
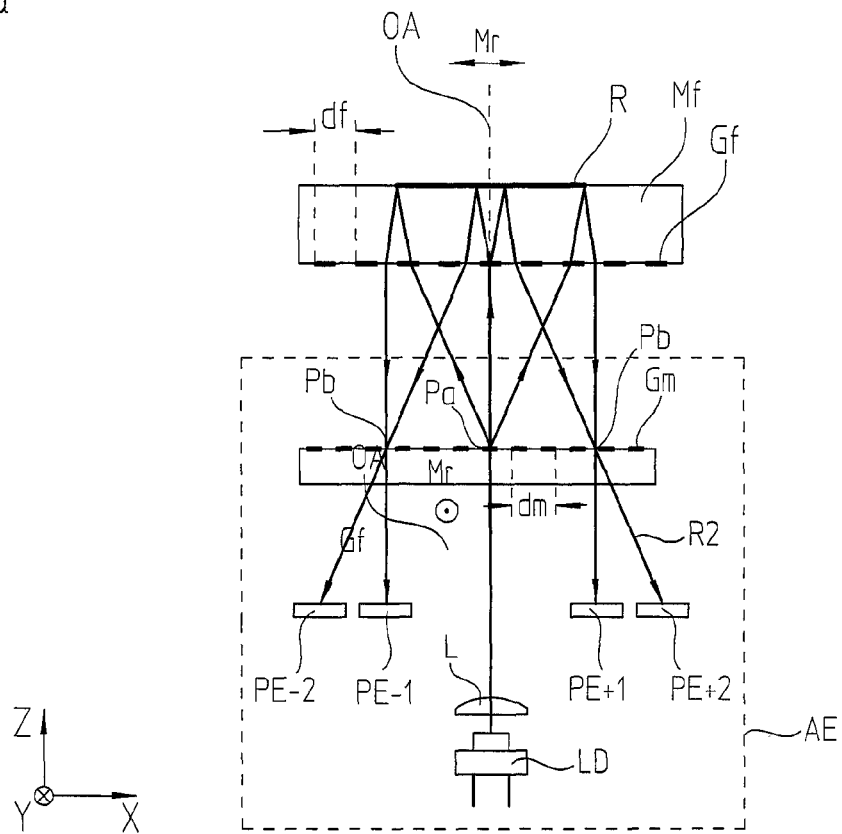
FIG. 6a shows a front view of scanning optics of a position-measuring device according to an example embodiment of the present invention.
Figure 6B:
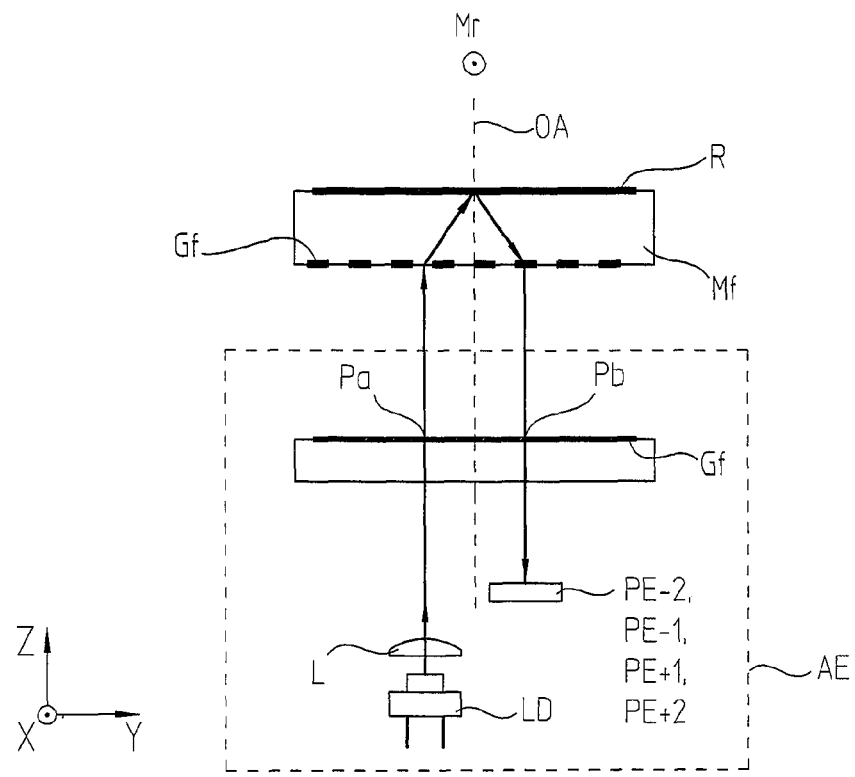

The three split partial beams of rays propagate in the direction of scale Mf which is movable relative to scanning unit AE, and which bears measuring graduation Gf on its lower side, that is, the side facing scanning unit AE. In this example, measuring graduation Gf again takes the form of a special transmitted-light graduation. In this exemplary embodiment, measuring graduation Gf has a graduation period or periodicity df=2*dm. In this manner, the partial beams of rays, as viewed in measuring direction Mr, are not deflected exactly parallel to optical axis OA as in the first exemplary embodiment, but rather, after passing through measuring graduation Gf the first time, the partial beams of rays as illustrated in FIG. 6a retain a portion of their beam tilt. In measuring direction Mr, a slight beam offset thereby results within scale Mf. Transversely thereto, measuring graduation Gf focuses the partial beams of rays, analogous to the first example, and again deflects them, so that in the focused state, they strike reflector element R on the back side of the support element of scale Mf, which is oriented facing away from scanning unit AE. After being reflected at reflector element R, the partial beams of rays arrive again at measuring graduation Gf. There, they are deflected again in measuring direction Mr, the deflection taking place symmetrically with respect to the arriving partial beams of rays. Transversely to measuring direction Mr, measuring graduation Gf collimates the partial beams of rays again and directs them parallel to optical axis OA. The exiting partial beams of rays arrive back at transmitted-light scanning grating Gm in scanning unit AE, where they are superposed by diffraction in the $+1^{st}$ or $-1^{st}$ order of diffraction at combining location Pb and brought to interference. Four position signals, phase-shifted by 90° in each instance, are detected via four detector elements PE−1, PE−2, PE+1, PE+2. In case of need, by the parallel interconnection of detector elements PE−1 and PE+1, three position signals phase-shifted by 120° could also be detected.

Because of the perpendicular illumination along optical axis OA, a high symmetry of the scanning-ray trajectory results. This yields a great insensitivity to changes in scanning distance and tilts. Moreover, a large offset occurs here between the incoming beam of rays from light source LD and the exiting beams of rays detected by detector elements PE−1, PE−2, PE+1, PE+2. Because detector elements PE−1, PE−2, PE+1, PE+2 detect only those beams of rays which are displaced both in measuring direction Mr and transversely thereto, all other beams of rays—coming about due to unintended orders of diffraction—do not arrive at detector elements PE−1, PE-2, PE+1, PE+2, so that the signal currents generated exhibit only minor interferences.

As in the previous example embodiments, because of the retro-reflective properties of scale Mf, no additional components are needed in scanning unit AE to realize a retro-reflective effect. Overall expenditure is therefore reduced.

Figure 7A:
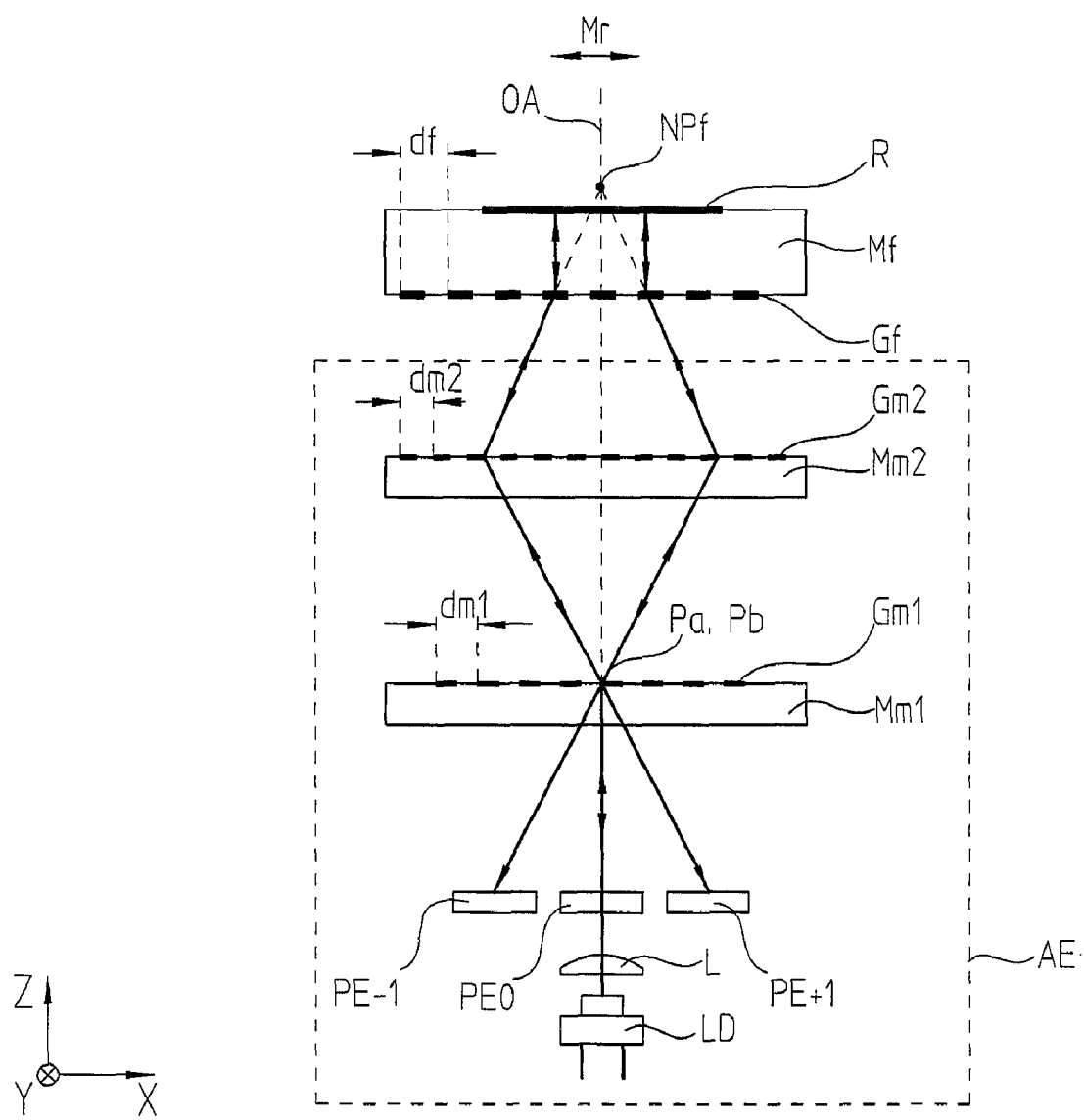
FIG. 7a shows a front view of scanning optics of a position-measuring device according to an example embodiment of the present invention.

A fourth exemplary embodiment is described with reference to FIGS. 7a and 7b, which again show various views of a position-measuring device analogous to the previous examples.

On the side of scanning unit AE, the beam of rays emitted by light source LD is again collimated by a collimator lens L, and is directed parallel to optical axis OA, perpendicularly to splitting means Mm1, Mm2. In contrast to the previous exemplary embodiments, splitting devices Mm1, Mm2 in scanning unit AE are formed in two parts, and include a first transmitted-light scanning grating Gm1 having the periodicity dm1, as well as a second transmitted-light scanning grating Gm2 having the periodicity dm2; periodicities dm1, dm2 of the two transmitted-light scanning gratings Gm1, Gm2 are selected according to dm2≈dm1/2.

Figure 7B:
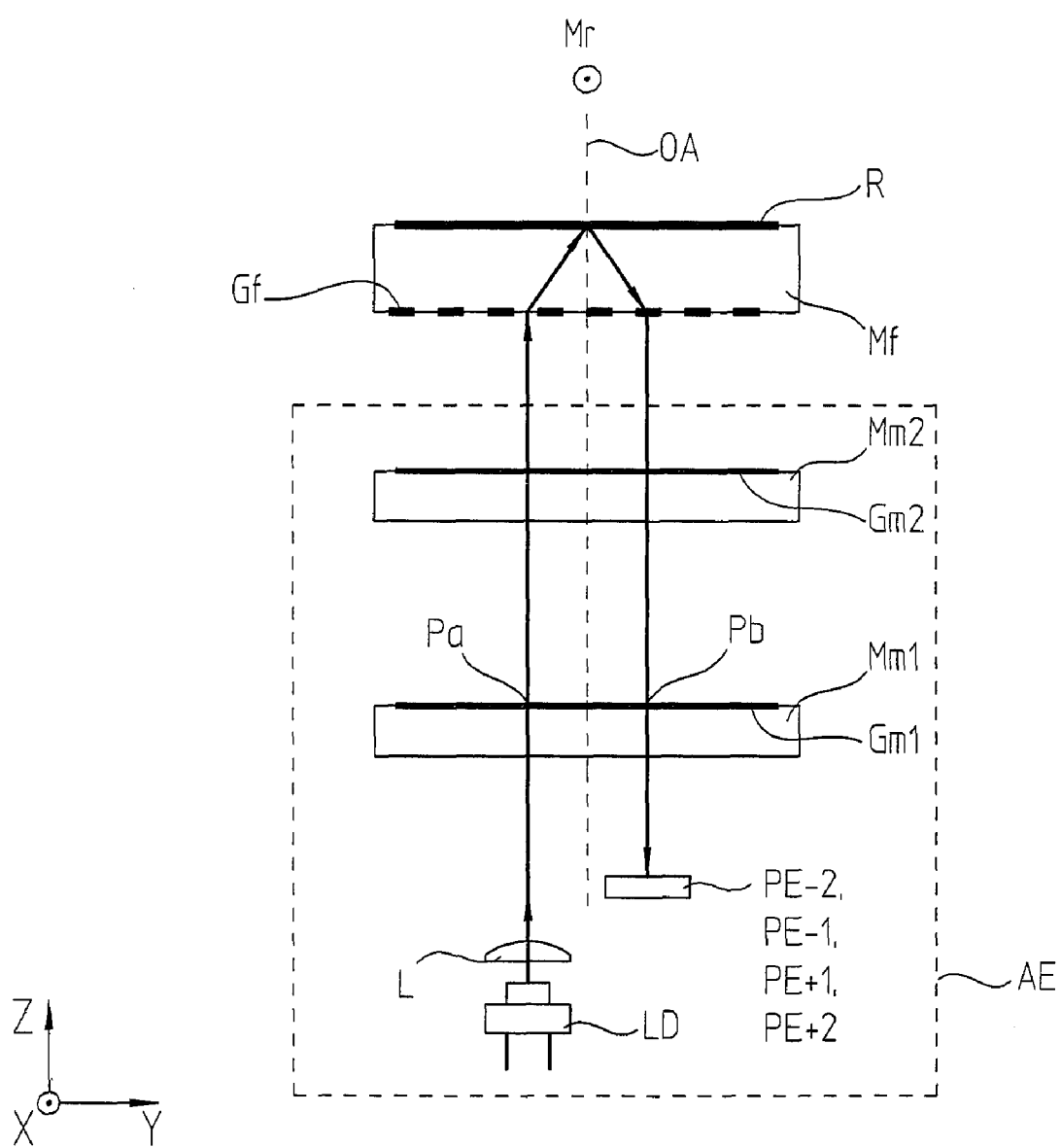

Via first transmitted-light scanning grating Gm1 disposed on the upper side of a transparent support element, the incident beam of rays is split at splitting location Pa into two partial beams of rays of $-1^{st}$ and $+1^{st}$ order of diffraction. The diffracted partial beams of rays propagate in the direction of second transmitted-light scanning grating Gm2, at which the two partial beams of rays are deflected back again in the direction of optical axis OA, before they propagate further in the direction of scale Mf movable relative to scanning unit AE. Scale Mf bears measuring graduation Gf on its lower side, that is, on the side facing scanning unit AE. In this example, measuring graduation Gf is again in the form of a special transmitted-light graduation having the optical effects already mentioned above. In this exemplary embodiment, measuring graduation Gf has a graduation period or periodicity df=dm1. After the impingement of measuring graduation Gf, the partial beams of rays are directed parallel to optical axis OA, deflected transversely thereto in the zy plane as illustrated in FIG. 7b, and focused onto reflector element R which is situated on the upper side of the support element of scale Mf. After being reflected at reflector element R, the partial beams of rays arrive again at measuring graduation Gf. There, in measuring direction Mr, they are deflected again into the direction of incidence. Transversely to measuring direction Mr, measuring graduation Gf collimates the partial beams of rays again and directs them parallel to optical axis OA. The exiting partial beams of rays arrive back at second transmitted-light scanning grating Gm2 in scanning unit AE, where they are deflected in the direction of combining location Pb on first transmitted-light scanning grating Gm1. At combining location Pb, the split partial beams of rays are superposed again and brought to interference. Three position signals, phase-shifted by 120° in each instance, are detected via three detector elements PE−1, PE0, PE+1.

Because of the two transmitted-light scanning gratings Gm1, Gm2 provided and the scanning-ray trajectory associated with them, a special position of what is referred to as the neutral pivot NPf of the position-measuring device results in this exemplary embodiment. In this context, the neutral pivot should be understood to be that point about which scanning unit AE and scale Mf are able to tilt without the position signals generated being faulty. As evident from FIG. 7a, neutral pivot NPf lies above measuring graduation Gf, that is, above scale Mf. This is advantageous for measuring applications in which scale Mf and scanning unit AE must be situated below the "tool center point", and the Abbe condition must be satisfied because of high accuracy requirements. Moreover, in this exemplary embodiment, the high symmetry of the scanning-ray trajectory should also be pointed out, which has a favorable effect on scanning-distance and tilting tolerances.

Besides the examples described, there are also a multitude of further example embodiments within the scope of the present invention.

For example, the reflection at reflector element R of scale Mf may also be accomplished by a total reflection. In this case, a reflector coating is no longer necessary.

Moreover, on the side of the scales, it is possible to arrange reference marks for producing the absolute reference. In this context, for instance, "chirped reference marks" may be provided, which have a chirped graduation in the measuring direction that is combined with a diffractive cylindrical lens transverse to the measuring direction. The structure of this chirped graduation corresponds locally to that from the example in FIG. 3, however, graduation period df changing continually along measuring direction Mr ("chirped"). In this context, the scanning-ray trajectory of the reference mark may correspond to one of the scanning-ray trajectories of the example embodiments above, the partial beams of rays in measuring direction Mr extending slightly divergently or convergently because of the chirped graduations. Reference is made here to German Published Patent Application No. 196 48 018 for the exact arrangement of such a reference mark having chirped graduations.

Usually, reference-mark tracks and periodic incremental tracks are disposed side-by-side on the scale. The result is that the effective measuring points for both tracks also lie side-by-side transversely to the measuring direction, and in response to a moiré tilting of the scale, the reference-mark signals are shifted relative to the incremental signals. This disadvantage can be avoided if all the graduation tracks are laid out such that their cylindrical lens have an optical axis in common, and both the incremental tracks and the reference-mark tracks are in each case disposed symmetrically with respect to the optical axis. In this case, both effective measuring points are located on the optical axis, and a possible moiré tilting then no longer has any influence on the assignment of incremental signals and reference-mark signals.

Moreover, the local periodicities of the measuring graduation may be so finely selected that only the desired orders of diffraction occur, and higher unwanted orders of diffraction are suppressed. In particular, it is beneficial if the $+3^{rd}$ and $-3^{rd}$ orders of diffraction are no longer able to propagate, both in the measuring direction and transversely thereto. To that end, graduation period df should be selected to be smaller than the threefold of the wavelength of the light source. The diffraction efficiency thereby increases considerably, that is, position signals having stronger intensity result.

In conclusion, it should be pointed out that the measures described herein may also be used in conjunction with rotary position-measuring devices. The different linear graduations would then have to be replaced by suitably formed radial graduations. For example, instead of the linear measuring graduation, a radial graduation would then have to be used with a cylindrical lens which, in each case, locally focuses in the radial direction, etc.

What is claimed is:

1. An optical position-measuring device, comprising:
    a scanning unit;
    a light source and at least one detector element assigned to the scanning unit; and
    a scale movable with respect to the scanning unit in at least one measuring direction, the scale arranged as a combined unit including includes at least one reflector element and a measuring graduation;
    wherein the scanning unit includes a splitting device configured to split a beam of rays emitted by the light source into at least two partial beams of rays in the measuring direction that, after being split, propagate in a direction of the scale.

2. The optical position-measuring device according to claim 1, wherein the optical position-measuring device is configured to determine a relative position of the scanning unit and the scale.

3. The optical position-measuring device according to claim 1, wherein the measuring graduation is configured such that the at least two partial beams of rays incoming from inversely symmetrical directions undergo an opposite deflection effect, and after impingement of the measuring graduation, propagate in same spatial directions.

4. The optical position-measuring device according to claim 1, wherein the measuring graduation is configured such that the at least two partial beams of rays incoming from different directions undergo an opposite deflection effect, and after impingement of the measuring graduation, propagate in symmetrical spatial directions.

5. The optical position-measuring device according to claim 3, wherein the measuring graduation is configured such that a first deflection effect on the incoming partial beams of rays results in a plane defined by the measuring direction and a normal to the scale, and a second deflection effect on the incoming partial beams of rays results in a direction oriented transversely to the measuring direction, a focusing effect associated with the second deflection, so that a focusing on the at least one reflector element occurs.

6. The optical position-measuring device according to claim 5, wherein the measuring graduation is arranged as an alternating linear cylindrical-lens structure.

7. The optical position-measuring device according to claim 1, wherein the measuring graduation has a periodicity such that only partial beams of rays of a +1st and −1st order of diffraction exit in both deflection directions, and unwanted higher orders of diffraction are suppressed.

8. The optical position-measuring device according to claim 7, wherein the higher orders of diffraction include +3d and −3d orders of diffraction.

9. The optical position-measuring device according to claim 1, wherein in the scale, the split partial beams of rays are initially diffracted at the measuring graduation, are thereupon reflected at the at least one reflector element, and are diffracted again at the measuring graduation before propagation again in a direction of the scanning unit.

10. The optical position-measuring device according to claim 1, wherein the measuring graduation is arranged as at least one of (a) a transmitted-light graduation and (b) a reflected-light graduation.

11. The optical position-measuring device according to claim 1, wherein the scale includes a transparent support member, the measuring graduation arranged on one side of the support member, at least one reflector element arranged on the opposite side of the support member.

12. The optical position-measuring device according to claim 11, wherein the measuring graduation arranged as a transmitted-light graduation is arranged on a side of the support member facing the scanning unit.

13. The optical position-measuring device according to claim 11, wherein the reflector element is arranged as one of (a) at least one plane reflector mirror and (b) a totally reflective surface.

14. The optical position-measuring device according to claim 1, wherein the splitting device in the scanning unit includes at least one transmitted-light scanning grating.

15. The optical position-measuring device according to claim 1, wherein a plurality of graduation tracks are arranged on the scale.

16. The optical position-measuring device according to claim 5, wherein a plurality of graduation tracks are arranged on the scale, the second deflection effect of all graduation tracks having a common focus.

17. The optical position-measuring device according to claim 1, wherein the measuring graduation of the scale is arranged as a phase graduation having a phase height of 180°.

18. The optical position-measuring device according to claim 5, wherein the second deflection effect is dimensioned such that a beam offset at the scale between an incoming and an exiting beam of rays is greater than a beam cross-section.

* * * * *